April 11, 1933.  E. G. GUNN  1,903,453
SHOCK ABSORBER
Filed Oct. 26, 1925  2 Sheets-Sheet 1

Inventor
Earl G. Gunn

Attorneys

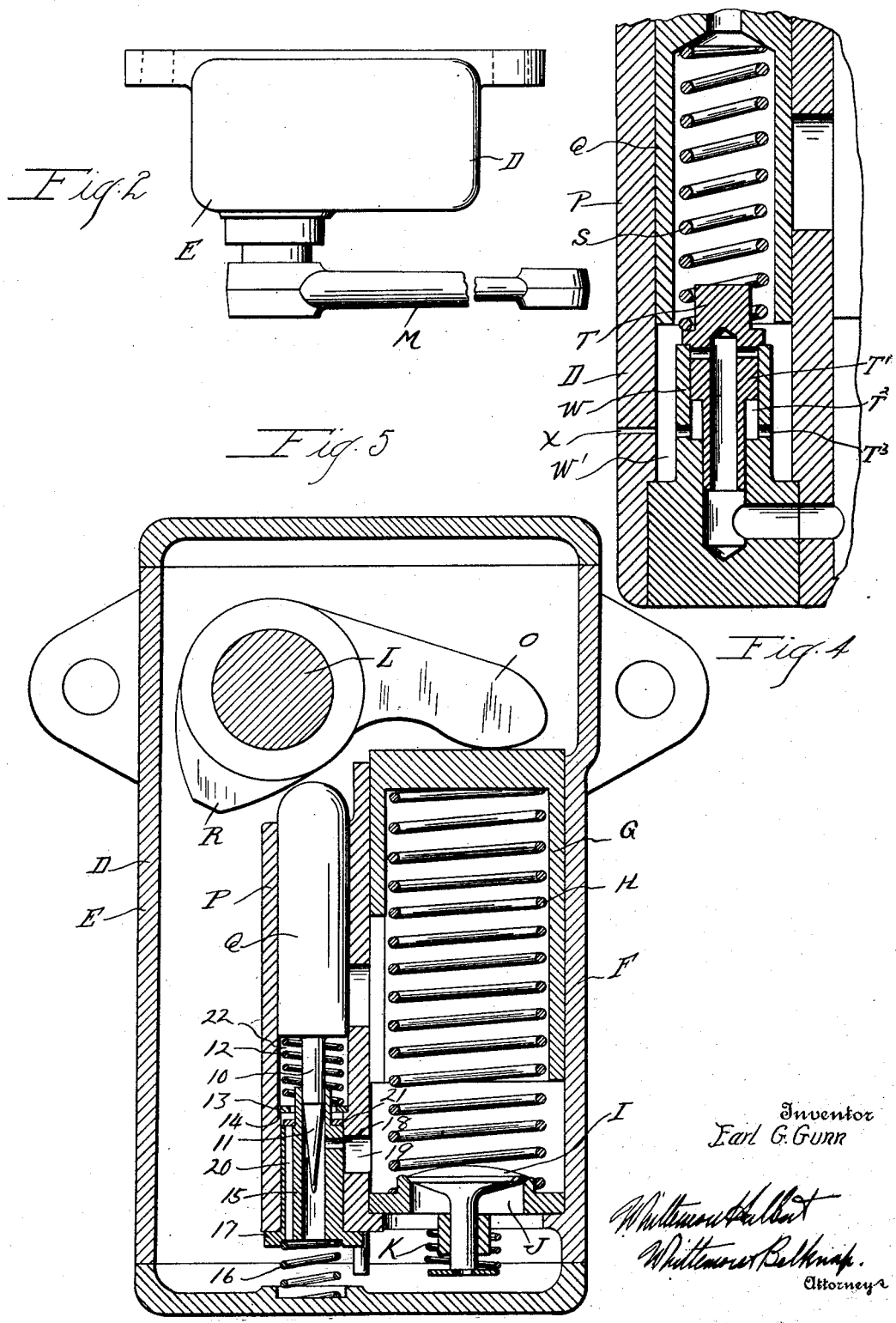

Patented Apr. 11, 1933

1,903,453

UNITED STATES PATENT OFFICE

EARL G. GUNN, OF RACINE, WISCONSIN

SHOCK ABSORBER

Application filed October 26, 1925. Serial No. 64,948.

The invention relates to shock absorbers of the hydraulic type more particularly designed for use in connection with motor vehicles and functioning to prevent too violent recoil of the springs when subjected to deflections.

It is the object of the invention to obtain a construction which permits great freedom of action of the vehicle springs in the performance of the normal function while at the same time effectually preventing any violent throwing of the vehicle due to spring recoil and to this end the invention consists in the construction as hereinafter set forth.

In the drawings:

Figure 2 is a plan view thereof.

Figure 4 is an enlarged section of a portion of Figure 3 showing a slightly modified arrangement.

Figure 5 is a vertical longitudinal section of a modified construction.

Figure 1:
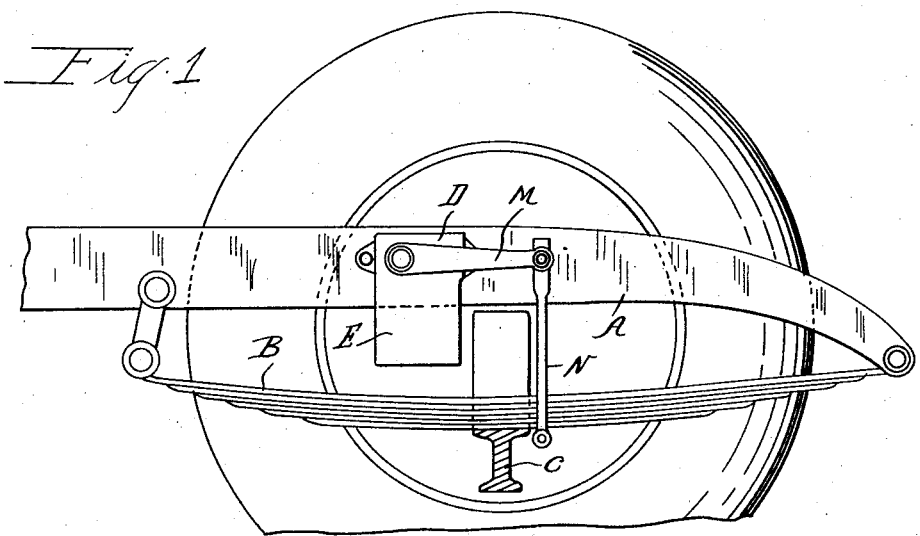
Figure 1 is a side elevation of a portion of a vehicle frame showing my improved shock absorber applied thereto.
Figure 3:
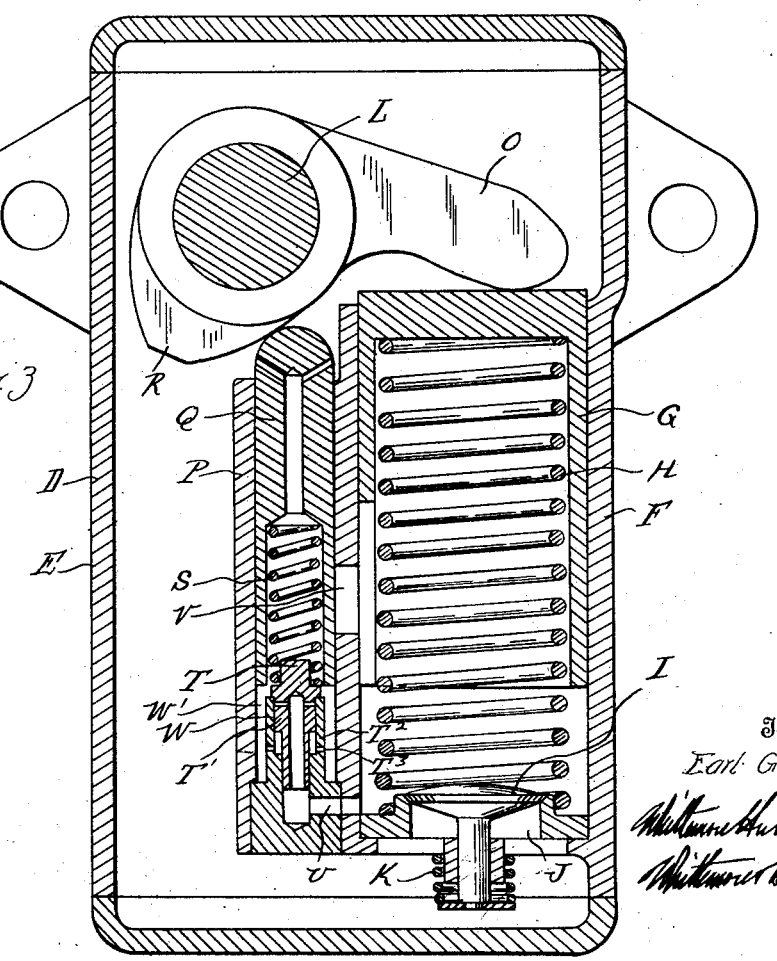
Figure 3 is a vertical longitudinal section.

As has been stated, my improvement is designed to permit the free functioning of the vehicle springs excepting where this would result in the throwing of the vehicle body, for instance, if one of the wheels passes over a slight depression in the road bed, the spring is not restrained from moving the wheel into the depression independent of any movement of the body. Again, if one of the wheels passes quickly over a sudden rise or hump in the pavement, the spring is not restrained from functioning in either its upward or downward movement. On the other hand, where the flexion of the spring is less rapid so as to permit the overcoming of the inertia of the vehicle body and the displacement of the same, this will throw into action the shock absorber which restrains the recoil of the spring and the amount of restraint is proportional to the amplitude of deflection.

As specifically shown, A is a portion of a vehicle frame; B one of the vehicle springs supported on the axle C, and D is my improved shock absorber. This comprises a casing E which is preferably bolted or otherwise firmly anchored to the frame member A, said casing constituting a reservoir for the oil or other fluid used as the resistance medium. Within this casing is a cylinder F having a piston G slidably engaging the same and yieldably forced outward by a spring H. I is a valve preferably of the poppet type controlling a large port J at the bottom of the cylinder and communicating with the chamber outside the same. This valve is normally yieldably held to its seat by a spring K but is permitted to open whenever the piston is moved outward by the spring H.

Extending transversely of the casing A and journaled in bearings therein is a rock shaft L which at its outer end has a rock arm M connected by the link N to the axle or other unsprung part. Within the casing the shaft L has mounted thereon the rock arm O which bears against the top of the piston G and is adapted to depress the same against the resistance of the spring H. P is a cylinder arranged parallel with the cylinder G and containing a slidable plunger Q which is in operative relation to a cam R on the rock shaft L. S is a spring arranged within a recess in the plunger Q and bearing against a valve T controlling an outlet passage U from the cylinder F. The arrangement is such that the opening of the valve T is yieldably resisted by the spring S while the tension of this spring is determined by the position of the plunger Q displaced by the cam R. Furthermore, the cam R is so fashioned that the inward movement of the plunger Q is proportional to the outward movement of the piston G and such as to place a predetermined tension in the spring S for resisting the opening of the valve T and escape of fluid through the passage U. There is also provision for locking the plunger Q against outward movement, this being preferably a port V in the side wall of the cylinder P which communicates with the cylinder F. Thus, whenever pressure is developed on the fluid in the cylinder F by an inward movement of the piston G, this fluid pressure acting against the side of the plunger Q will lock the latter from movement in the cylinder. With the construction as thus far described it will be apparent that when there is a relative movement of the axle C and frame A this, through the link N and rock arm M will rock the shaft L which, through the arm O will actuate the piston G and through the cam R will actuate the plunger Q. If the movement of the axle C is downward or away from its normal position in relation to the frame A, such movement will, through the connections described, force the plunger G downward expelling the fluid in the cylinder F by way of the passage U and by lifting the valve T. In the normal position of parts there is slight resistance to the movement of the valve T and the spring S is under slight tension, consequently there will be only negligible resistance to the free movement of the axle as described. On the other hand, if the axle is moved upward or towards the frame A, this will permit the outward movement of the piston G under actuation of the spring H, the valve I lifting to permit the ingress of fluid. However, during this outward movement of the piston G, the cam R will be forcing the plunger Q inward thereby compressing the spring S and increasing its tension. Upon reversal of direction of movement of the piston G and its initial inward movement, the pressure of the fluid in the cylinder F will lock the plunger so as to form a fixed abutment for the spring S and holding its tension to that determined by the amplitude of the inward movement of the plunger. Thus, the opening of the valve T is against the tension of the spring S which will determine the resistance to the displacement of the fluid from the cylinder F and the inward movement of the piston G. If the outward movement of the piston G is but slight, there will be a correspondingly small resistance to its inward movement whereas a greater outward movement of the piston G will produce a correspondingly higher resistance to its inward movement.

A serious defect of the construction as thus far described would be the resisting of the return of the spring B in case the vehicle wheel should quickly pass over an obstruction. While there would be no interference with the compression of the spring B, its recoil would be retarded even after the passage of the obstruction which would permit the dropping of the vehicle body. I have avoided this defect by the provision of means for diminishing the resistance to the displacement of the fluid from the cylinder F in proportion to the velocity of inward movement of the plunger Q. Stated in another way, the resistance to the recoil of the spring is inversely proportional to the velocity of its compression movement.

For accomplishing this purpose, the hollow portion of the plunger Q is arranged to telescopically engage a stationary piston W which forms a seat for the valve T. This forms an annular chamber W' between said piston and the cylinder P normally filled with fluid which must be expelled by the inward movement of said plunger. Escape of the fluid in this annular chamber is permitted either by leakage around the piston or as shown in Figure 4, by a restricted port X in the wall of the cylinder P and communicating with the outside chamber. The valve T is formed with the piston T' operating in a cylinder T² within the stationary piston W and one or more ports T³ establish communication between the annular chamber W' and the cylinder T². With this construction, whenever the plunger Q is moved rapidly inward the resistance to the displacement of fluid in the annular chamber W' due to the restriction of the port X will develop pressure on such fluid which will be communicated through the port T³ to the cylinder T². The pressure in the cylinder T² will lift the piston T' which will overcome the tension of the spring S and lift the valve T sufficiently from its seat to remove resistance to displacement of the fluid from the cylinder F. Consequently there will be no appreciable resistance to the free movement of the parts whenever velocity of movement is sufficiently high which permits the vehicle springs to function without restraint under such conditions.

A modified arrangement for providing a mechanism responsive to the velocity of compression of the main spring B is shown in Figure 5. In this construction the plunger Q is provided with a depending portion 10 of reduced diameter carrying at the lower end thereof the tapered metering pin 11. A spring 12 surrounds the portion 10 and is seated at one end on the plunger Q and at the other end on a washer 13, the latter being supported by the annular shoulder 14 in the cylinder P. A cylindrical member 15 is slidably arranged in the cylinder P below the shoulder 14 and has a longitudinal bore therein open at the bottom to the outside chamber and extending upward to receive the metering pin 11. The member 15 is supported by a coil spring 16 which normally holds the same upward with the annular flange 17 seating on the lower end of the cylinder Q. 18 is a lateral aperture extending through the wall of the member 15 and communicating with a larger aperture 19 in the wall of the cylinder F. The member 15 is also provided with a longitudinal bore 20 extending parallel to the central bore and a washer 21 forms a check valve for normally closing this bore.

With this modified construction, the fluid from the cylinder F escapes to the outside chamber by way of apertures 19 and 18 and the amount of restriction to the flow of the liquid is determined by the position of the metering pin 11 which, in turn, is dependent upon the position of the plunger Q as determined by the cam R. When the movement of the plunger Q is rapid, a pressure is built up in the chamber 22 surrounding the portion 10 and this pressure forces the cylindrical member 15 downward against the action of spring 16 thereby enlarging the restriction introduced by the metering pin 11 and permitting more fluid to escape from the cylinder F. The upward movement of the plunger Q is unrestricted due to the provision of the check valve 21 which permits the liquid to fill the chamber 22 by way of the bore 20. One of the features of this construction is that the pressure in the cylinder F not only locks the plunger Q as in the modification first described, but also locks the cylindrical member 15 by reason of the pressure acting laterally through the enlarged aperture 19. It will be apparent therefore that the amount of resistance to the escape of the fluid from the cylinder F and consequently the amount of snubbing of the return movement of spring B is determined by two factors, first, the setting of the plunger Q and metering pin 11 which depends upon the amplitude of movement of the spring B when deflected by road conditions and second, the position of the co-operating member 15 which depends upon the velocity of movement of the spring.

What I claim as my invention is:

1. The combination with a stationary member and an oscillatory member movable with neglible resistance in either of opposite directions from a neutral position with respect to said stationary member, of means reacting between said members but independent of any movement of said stationary member for resisting the return movement of said oscillating member from one side of its neutral position with an undiminishing force jointly determined by the amplitude and velocity of the free movement.

2. The combination with a stationary member and an oscillatory member movable with negligible resistance in either of opposite directions from a neutral position with respect to said stationary member, of means reacting between said members but independent of any movement of said stationary member for resisting return movement from a position on one side of the neutral point operable only when the velocity of free movement is less than a pre-determined limit.

3. The combination with a stationary member and an oscillatory member movable with negligible resistance in one direction with respect to said stationary member, of means reacting between said members but independent of any movement of said stationary member operable only when the velocity of said free movement is less than a predetermined limit for resisting return movement with an undiminishing force determined by the amplitude of said free movement.

4. The combination with a stationary member and an oscillatory member movable with negligible resistance in either of opposite directions from a neutral position with respect to said stationary member, of means reacting between said members but independent of any movement of said stationary member for resisting return movement of said oscillating member from one side of its neutral point operable only when the velocity of free movement is less than the predetermined limit and with an undiminishing force proportional to the amplitude of said free movement.

5. The combination with a stationary member and an oscillatory member movable with negligible resistance in one direction with respect to said stationary member, of means reacting between said members but independent of any movement of said stationary member operable only when the velocity of said free movement is less than a predetermined limit for resisting movement in the opposite direction by an undiminishing force determined by the amplitude of the free movement and continuing throughout the entire movement in the opposite direction.

6. The combination with a stationary member and an oscillatory member movable with negligible resistance in one direction with respect to said stationary member, of means reacting between said members but independent of any movement of said stationary member operating only when the velocity of said free movement is less than a predetermined limit for resisting movement in the opposite direction by an undiminishing force initially determined by the amplitude of free movement and continuing through the entire extent of the opposite movement on both sides of the neutral position.

7. The combination with a stationary member and an oscillatory member movable with negligible resistance in either of opposite directions from a neutral position with respect to said stationary member, of means reacting between said members but independent of any movement of said stationary member operable only when the velocity of free movement is less than a predetermined limit and in one direction from the neutral point for resisting movement in the opposite direction by a force initially determined by the amplitude of said free movement continuing throughout the entire extent of the opposite movement and terminating on reversal of movement.

8. The combination with a stationary member and an oscillatory member movable with negligible resistance in either of opposite directions from a neutral position with respect to said stationary member, of means reacting between said members but independent of any movement of said stationary member for resisting return from a movement in one direction by an undiminishing force determined by the amplitude of the free movement, and means operative when the velocity of free movement is greater than a predetermined limit for neutralizing said resistance.

9. The combination with a relatively oscillatory piston and fluid containing cylinder, of means permitting displacement of said fluid with a negligible resistance in either direction, means set in operation by a movement of the piston in one direction for increasing the force of resistance to displacement of the fluid by a movement of said piston in the opposite direction, and means operating when the velocity of the said first movement of the piston is more than a predetermined limit for neutralizing said increased resistance force.

10. The combination with a relatively oscillatory piston and fluid containing cylinder, of means permitting displacement of fluid with a negligible resistance upon movement of said piston in either direction from a neutral position, means set in operation by a movement of said piston in one direction for increasing the force of resistance to fluid displacement by the opposite movement of said piston and proportional to the amplitude of free movement, and means operated by the first mentioned movement of said piston at a velocity above a predetermined limit for neutralizing said increased resistance force whereby free return movement of said piston is permitted.

11. The combination with a relatively oscillatory piston and fluid containing cylinder, of means permitting fluid displacement with a negligible resistance by a movement of said piston in either direction from its neutral position, means for increasing resistance to displacement of fluid by the return movement of said piston in one direction determined by the velocity and amplitude of the previous movement of said piston in the opposite direction.

12. The combination with a relatively oscillatory piston and fluid containing cylinder provided with ports for ingress and egress of fluid, of valves controlling said ports with a negligible resistance, means operating upon movement of said piston in one direction for increasing resistance to the movement of the valve controlling the displacement of the fluid by a movement of the piston in the opposite direction, the amount of said resistance force being determined by the amplitude of the first movement of said piston, and means operating when the velocity of said first movement is above a predetermined limit for neutralizing said resistance force to permit unresisting displacement of the fluid.

13. The combination with a stationary member and an oscillatory member movable with negligible resistance in opposite directions from a neutral position, of means reacting between said members but independent of any movement of said stationary member for resisting return movement of said member from one side of its neutral position inversely proportional to the velocity of the free movement.

14. The combination with a stationary member and an oscillatory member movable with negligible resistance in one direction with respect to said stationary member, of means reacting between said members but independent of any movement of said stationary member for resisting return movement of said member inversely proportional to the velocity of the free movement.

15. The combination with a stationary member and an oscillatory member movable with negligible resistance in one direction with respect to said stationary member, of means reacting between said members but independent of any movement of said stationary member for resisting return movement of said member to its normal position inversely proportional to the velocity of its free movement and directly proportional to the amplitude of said movement.

16. The combination with a stationary member and an oscillatory member movable with negligible resistance in one direction with respect to said stationary member, of means reacting between said members but independent of any movement of said stationary member for resisting return movement of said member by a force continuing in full throughout said movement and inversely proportional to the velocity of the free movement.

17. In a shock absorber, the combination of two members relatively movable in either of opposite directions from a neutral position with negligible resistance, and means for resisting return movement of said members from one side of said neutral position with an undiminishing force jointly determined by the amplitude and velocity of the first mentioned movement.

18. In a shock absorber, the combination with a relatively movable cylinder and piston, of means for admitting fluid to the cylinder upon the outward movement of the piston, means permitting escape of fluid from the cylinder upon the inward movement of the piston and means for resisting said escape of fluid with a variable but undiminishing force jointly determined by the velocity and amplitude of said outward movement.

In testimony whereof I affix my signature.
EARL G. GUNN.